United States Patent [19]

Haraguchi

[11] Patent Number: 4,733,362

[45] Date of Patent: Mar. 22, 1988

[54] DRUG DISPENSING APPARATUS WITH A PRINTER HAVING PROGRAMMABLE FORMAT

[75] Inventor: Manabu Haraguchi, Gunma, Japan

[73] Assignees: Sanyo Electric Co., Ltd., Osaka; Tokyo Sanyo Electric Co., Ltd., Gunma, both of Japan

[21] Appl. No.: 778,033

[22] Filed: Sep. 20, 1985

[30] Foreign Application Priority Data

Apr. 2, 1985 [JP] Japan ................... 60-69773

[51] Int. Cl.⁴ .................. G08B 5/00; G07F 11/68
[52] U.S. Cl. ..................... 364/479; 364/900; 400/61; 400/62; 53/75; 206/534; 221/2; 221/12; 221/15; 221/197
[58] Field of Search ............. 364/478, 479, 569, 900; 400/61, 62, 64; 221/2, 3, 9, 12, 13, 15, 76, 197; 53/75; 206/528, 534, 534.1, 538

[56] References Cited

U.S. PATENT DOCUMENTS

| | | | |
|---|---|---|---|
| 3,907,100 | 9/1975 | Ranford et al. | 221/160 |
| 3,917,045 | 11/1975 | Williams et al. | 221/71 |
| 3,964,638 | 6/1976 | Dimauro | 221/15 |
| 3,985,264 | 10/1976 | Shaw et al. | 221/13 |
| 4,086,660 | 4/1978 | McBride | 400/61 |
| 4,229,794 | 10/1980 | Foster | 235/432 |
| 4,318,477 | 3/1982 | Kerpe | 206/534 |
| 4,334,286 | 6/1982 | Kerigan et al. | 364/900 |
| 4,429,792 | 2/1984 | Mackhbitz | 206/531 |
| 4,460,975 | 7/1984 | Forkelsen et al. | 364/900 |
| 4,473,884 | 9/1984 | Behl | 221/2 |
| 4,490,963 | 1/1985 | Knudsen | 53/453 |
| 4,546,901 | 10/1985 | Buttavazzi | 221/13 |
| 4,548,519 | 10/1985 | Schroeder | 400/61 |
| 4,560,293 | 12/1985 | McAmber et al. | 400/61 |

FOREIGN PATENT DOCUMENTS

| | | | |
|---|---|---|---|
| 57-4981 | 1/1982 | Japan | |
| 2077970 | 12/1981 | United Kingdom | 400/61 |

*Primary Examiner*—Jerry Smith
*Assistant Examiner*—John R. Lastova
*Attorney, Agent, or Firm*—Armstrong, Nikaido, Marmelstein & Kubovcik

[57] ABSTRACT

A drug dispensing apparatus which is arranged to form divided separate packets during intermittent transport of a packaging sheet in its longitudinal direction and to print messages for predetermined items on the separate packets. The print format may be edited as desired by an operator. Portions of the packaging sheet which are not part of the separate pockets may be printed with the cumulative status of the drug dosage which is accommodated in the printed pockets.

8 Claims, 17 Drawing Figures

| | | Ordinary prescription | Before a meal | Between meals | After a meal |
|---|---|---|---|---|---|
| | | 0 | 1 | 2 | 3 |
| Morning | 0 | MORNING | BEF·BKFT | DUR·BKFT | AFT·BKFT |
| Noon | 1 | AFT·NOON | BEF·LNCH | DUR·LNCH | AFT·LNCH |
| Evening | 2 | EVENING | BEF·DNNR | DUR·DNNR | AFT·DNNR |
| Bedtime | 3 | BED TIME | BED·TIME | BED·TIME | BED·TIME |

Fig. 6

| | | Ordinary prescription 0 | | | Before a meal 1 | | | Between meals 2 | | | After a meal 3 | | |
|---|---|---|---|---|---|---|---|---|---|---|---|---|---|
| Morning | 0 | MORNING | BEF. | BKFT | BKF.BKFT | DUR.BKFT | AFT.BKFT |
| Noon | 1 | AFT.NOON | BEF. | LNCH | LNC.LNCH | DUR.LNCH | AFT.LNCH |
| Evening | 2 | EVENING | BEF. | DNNR | DNN.DNNR | DUR.DNNR | AFT.DNNR |
| Bedtime | 3 | BEDTIME | BED. | TIME | BED.TIME | BED.TIME | BED.TIME |

Fig. 10

38 — 1984.01.19　《 PRESCRIPT. INPUT 》　　P.4 — 39
36 — PATIENT. NAME. T. HARAGUCHI　　CODE AE1184 — 37

| No. | NAME OF DRUG | MNEB | No. OF DAYS 7MOR 7NOON 7EVE 0BED |
|-----|--------------|------|---------|
| 1 | A TAB. | 1110 | |
| 2 | B TAB. | 1110 | |
| 3 | C TAB. | 1110 | |
| 4 | D TAB. | 1110 | |

PREFIX

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|
| X | X | X | X | X | X | X | X | X | X | X | X | | | | | | | ! | ! | ! | ! | ! | ! | ! | ! |
| # | # | # | # | # | # | # | # | | | | $ | $ | $ | $ | $ | $ | $ | | N | O | . | % | % | % | |

DRUG DISPENSING APPARATUS WITH A PRINTER HAVING PROGRAMMABLE FORMAT

BACKGROUND OF THE INVENTION

The present invention generally relates to drug handling equipment and more particularly, to a drug dispensing apparatus which is arranged to continuously form separate packets or pouches (referred to as packets hereinafter) by a packaging sheet or paper for accommodating individual drug doses therein, with patients' names, times for taking the drug doses, etc. being printed on the packets for dispensing.

It is to be noted here that the term "drug" as employed throughout this specification should be understood as including medicine in the form of pills, tablets, capsules or the like.

For a drug dispensing apparatus, there has conventionally been proposed a technique disclosed, for example, in U.S. Pat. No. 3,917,045, which is so arranged that, upon input of information related to drugs to be taken by patients according to prescriptions, the drug dosages are discharged according to this input information so as to be introduced into receptacles which are set for respective patients. However, according to this prior art, it is necessary to preliminarily determine a receptacle to receive the drugs for each patient, and to set the receptacle for the patient who needs the drug doses on the apparatus during the discharging of the drugs, thus the operation being made undesirably troublesome. Furthermore, in the above prior art technique, since the drugs are supplied upon arrival at the time for the patients to take the drugs, use of the apparatus is concentrated upon the respective drug taken time.

Therefore, according to this invention, in a drug dispensing apparatus arranged to supply discharged drugs into separate packets formed by a packaging sheet, it is intended to print discriminating data such as names and the like for respective patients, and time of taking drugs on the packets. By effecting such printing on the packets, not only the troublesome procedures for preparing receptacles for the respective patients or for setting receptacles on the apparatus are eliminated, but erroneous recognition of the drug taking time may be advantageously prevented, and thus, it becomes possible to continuously supply the drug doses at respective drug taking time at one time.

When the packets are printed with various times identifying individual data for each patient, such as drug taking time, etc. one requirement is to provide a function of providing printed portions on the packets for each printed item according to shape and kind of drugs to be packed, and also, according to the size of the packets. Furthermore, the packets after packing the drugs therein must be inspected to see if correct drug doses as input have been accommodated therein, for which purpose, each of the packets should be compared with the prescription, thus, also requiring a time consuming procedure.

SUMMARY OF THE INVENTION

Accordingly, an essential object of the present invention is to make it possible to freely prepare print formats for separate packets, and also to provide an improved drug dispensing apparatus which is capable of setting as desired, the printing portions to the packets for respective printing items.

Another important object of the present invention is to provide a drug dispensing apparatus of the above described type, in which the preparation of the print format is facilitated.

In accomplishing these and other objects, according to the prevent invention, various symbol keys are to correspond to respective print items making it possible to set printed portions with respect to the print items by operating any of the symbol keys. More specifically, according to the present invention, there is provided a print format memory having memory portions for storing one character code for one letter in correspondence to the range of rows of letter lines capable of being printed on the packets, so that each time any of the symbol keys is operated, the character codes representing the symbols are successively loaded into the respective memory portions of the print format memory according to the input order thereof, whereby it is made possible to prepare print formats as desired. Thus, upon setting of the print format memory, by accessing the memory portions which store the character codes with respect to the same symbols at the respective memory portions of the print format memory, the print portions with respect to the items corresponding to the symbols of the print format memory are detected, thereby to print the message preliminarily input in the print portions with respect to the items.

According to the present invention, by successively operating the symbol keys a number times corresponding to the maximum printing number with respect to the respective print items according to the order for the printing, print portions with respect to any desired print items may be readily set within the print format.

Accordingly, a further object of the present invention is to provide an improved drug dispensing apparatus which is capable of readily comparing contents of prescription with drug doses contained in packets by preliminarily printing the prescribed drug doses on predetermined portions of a continuous packaging sheet.

Another object of the present invention is to provide a drug dispensing apparatus of the above described type which is simple in construction and accurate in functioning at high reliability.

According to the present invention, the drug dispensing apparatus is provided with a transport device for continuously displacing a packaging sheet intermittently in a longitudinal direction, means of inputting kinds and number of drug doses and number of packets to be prepared, a packing mechanism for continuously forming separate packets by the packaging sheet to accommodate therein the drug doses, and a printer for printing prescription data representing the kinds and number of drug doses at prescription contents indicating portions to be separately formed from the divided packets of the packaging sheet.

By the above arrangement according to the present invention, it becomes possible to print the kinds and numbers of drug doses on the prescription content indicating portions separately formed from the divided packets, at part of the packaging sheet.

BRIEF DESCRIPTION OF THE DRAWINGS

These and other objects and features of the present invention will become apparent from the following description taken in conjunction with the preferred embodiments thereof with reference to the accompanying drawings, in which:

FIG. 6 is a diagram showing one example of printed patterns for taking medicine;

FIG. 10 is a diagram showing one example of input data;

FIG. 12 is a diagram showing one example of print format;

DETAILED DESCRIPTION OF THE INVENTION

Figure 1:
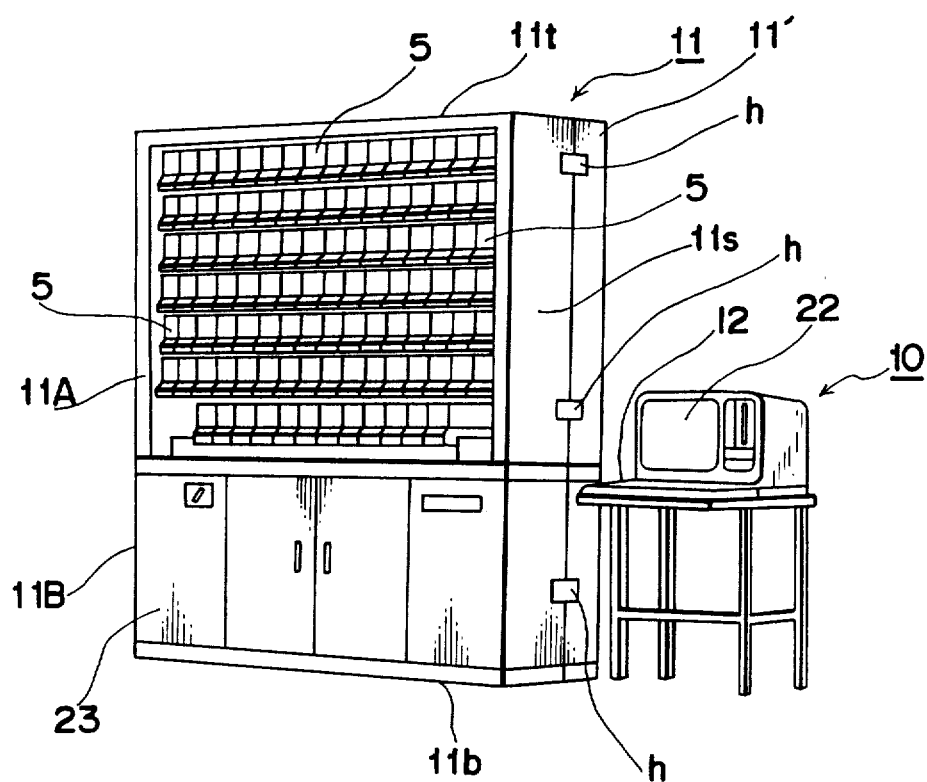
FIG. 1 is perspective view showing a general appearance of a drug dispensing apparatus according to one preferred embodiment of the present invention.

Before the description of the present invention proceeds, it is to be noted that like parts are designated by like reference numerals throughout the accompanying drawings.

Referring now to the drawings, there is shown in FIG. 1 a drug dispensing apparatus according to one preferred embodiment of the present invention, which generally includes a control unit 10 and a drug packing or dispensing unit 11. The control unit 10 is provided with a key input section 12 and a display CRT 22, and prepares prescription data and print data through key operation by the key input section 12 for transfer of the data to the drug dispensing unit 11, which carries out the dosage packing function based on the data thus transferred.

Meanwhile, the drug dispensing unit 11 is in a rectangular cubic box-like configuration having a top wall 11t, side walls 11s and a bottom wall 11b, and generally includes upper portion 11A in which a large number of drug cases or drug dispensing cartridges 5 (referred to as cartridges hereinafter) are accommodated, and a lower portion 11B in which a drug packing mechanism 23 is housed. Each of the cartridges 5 is arranged to be driven upon input of a predetermined drug pic-out signal to derive tablets, etc. so as to introduce the tablets into a drop passage formed therein (not particularly shown).

It is to be noted here that, depending on necessity for increasing the drug dispensing capacity and also for facilitation of cleaning the apparatus, another drug dispensing unit 11' having constructions similar to the unit 11 may further be pivotally connected, back to back, to said unit 11 at its one side, for example, by hinges h as shown for selective closing or contact, or opening or spacing therebetween about the hinges h.

Figure 2:
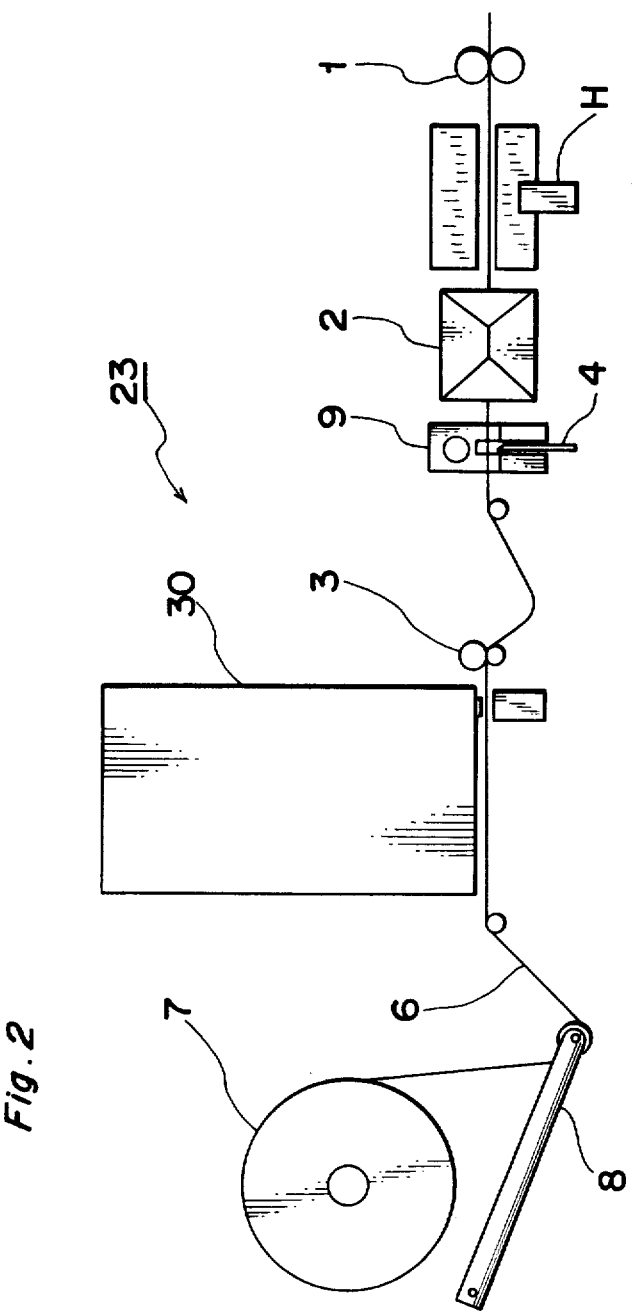
FIG. 2 is a schematic side elevational view showing a packing mechanism employed in the apparatus of FIG. 1.

Referring also to FIG. 2, the drug packing mechanism 23 accommodated in the lower portion 11b of the dispensing unit 11 includes a roll 7 of a packaging sheet formed by winding a packaging sheet 6 folded double, an arm member 8 pivotally connected at its one end, to a frame (not shown) of the lower portion 11B and contacting at its other end. The surface of the sheet 6 applies a tension thereto. A printer 30 prints patients' names, code numbers, time for taking the drug doses, etc. on the packaging sheet 6. Line feed rollers 3 are driven by a stepping roller (not shown). A longitudinal heat seal mechanism 9 applies longitudinal seals to the packaging sheet 6 and has a blade 4 to form notches for providing separate packets. A hopper 2 communicates with the drop passage to hold the tablets introduced thereinto introduces the tablets into the separate packets upon opening of a shutter (not shown). A lateral heat seal mechanism H closes upper openings of the separate packets after accommodation of the tablets therein. A pair of feeding rollers 1 intermittently displaces the packaging sheet one at a time in the longitudinal directio by the length for one packet. The printer 30 is arranged to print necessary information on the sheet 6 in a direction intersecting at right angles with the longitudinal direction of the packaging sheet 6 as shown at 50 and 51 in FIG. 3 according to a predetermined format (to be described in more detail later).

Figure 4:
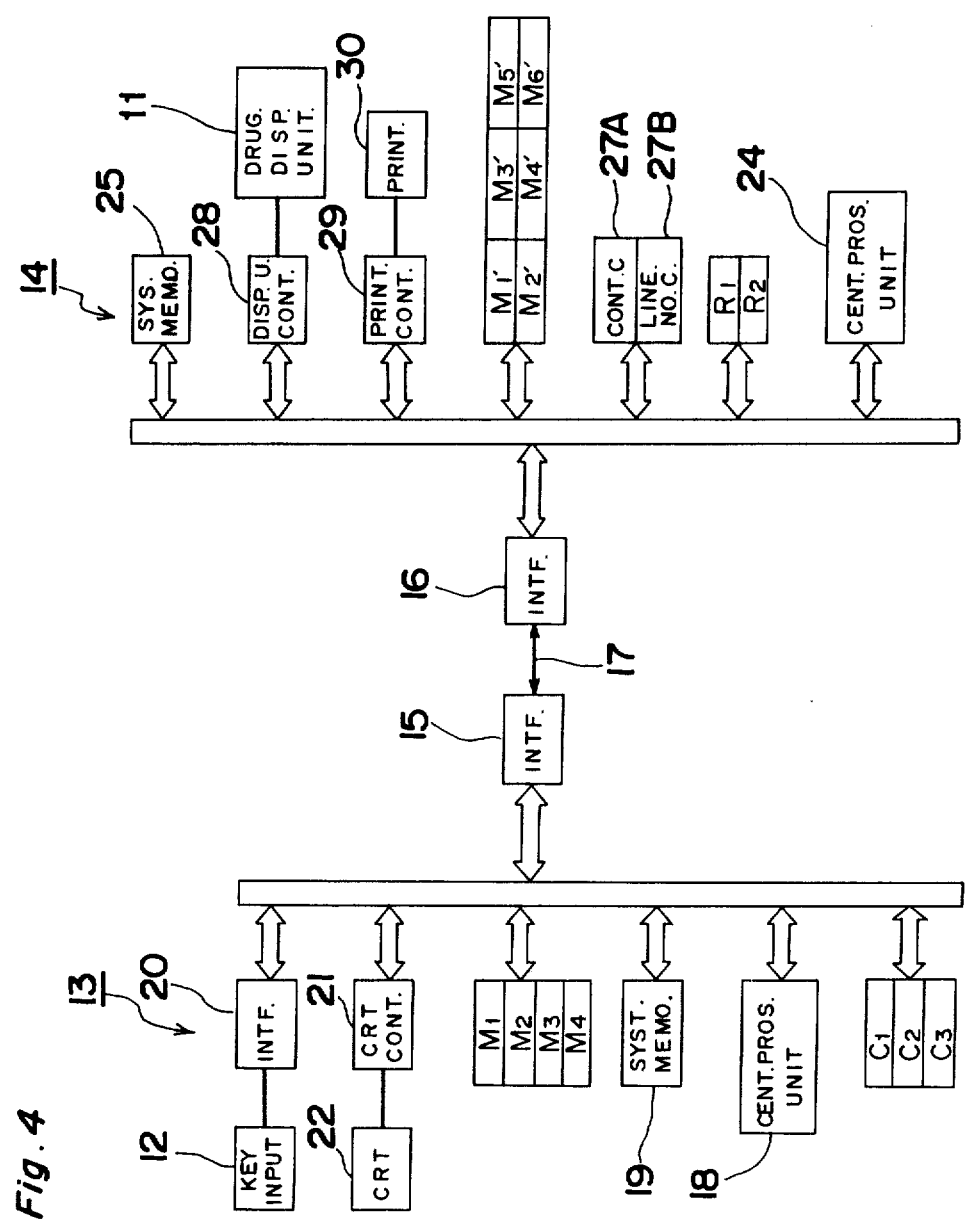
FIG. 4 is a chart for explaining a control system for the apparatus of FIG. 1.

Referring to FIG. 4, there is shown a control system for the drug dispensing apparatus according to the present invention, which includes a control circuit section 13 at the side of the control unit 10, and another control circuit section 14 at the side of the drug dispensing unit 11. The control circuit sections 13 and 14 are connected to each other by a transmission line 17 through interfaces 15 and 16 which subject the transmitting data to serial conversion, and the receiving data to parallel conversion.

The control circuit section 13 further includes a central processing unit 18, a system memory 19 in which the control procedure at the side of the control unit 10 is programmed, a keyboard interface 20 which produces key input signals by detecting operation of the key input section 12, a CRT controller 21 for effecting the display control of the CRT 22, memories M1, M2, M3 and M4, and counters C1, C2 and C3 for preparing data for taking the medicine or drug doses.

Meanwhile, the control circuit section 14 includes a central processing unit 24, a system memory 25 in which the control procedure at the side of the drug dispensing unit 11 is programmed, a drug dispensing unit controller 28 which controls the packing function of the drug dispensing unit 11, a printer controller 29 which applies printing signal and line renewal signal to the printer 30 for controlling the printing function, memories M1', M2', M3', M4', M5' and M6', a control counter 27A and a line number counter 27B, and registers R1 and R2.

The printer 30 is arranged to print two lines of letters (26 letters per line) on the separate packets according to the format in FIG. 12. Patients' names are represented by symbols "*", time for taking drugs or dosage is denoted by symbols "!", codes are represented by symbols "#", date of prescription is represented by symbols "$", and prescription numbers are denoted by symbols "%". These are the items to be printed (printing items). In the present embodiment, the format for letters for names of patients are limited to 16 letters, the format for times for taking drugs, to 8 letters, the format for codes, to 8 letters, the format for the date of the prescription, to 8 letters, and the format for prescription numbers, to 3 letters. However, other messages, for example, "No." preceding the prescription number, may be printed if they are within the limited number of formatted letters. These formats are stored in the memory M1.

Figure 5:
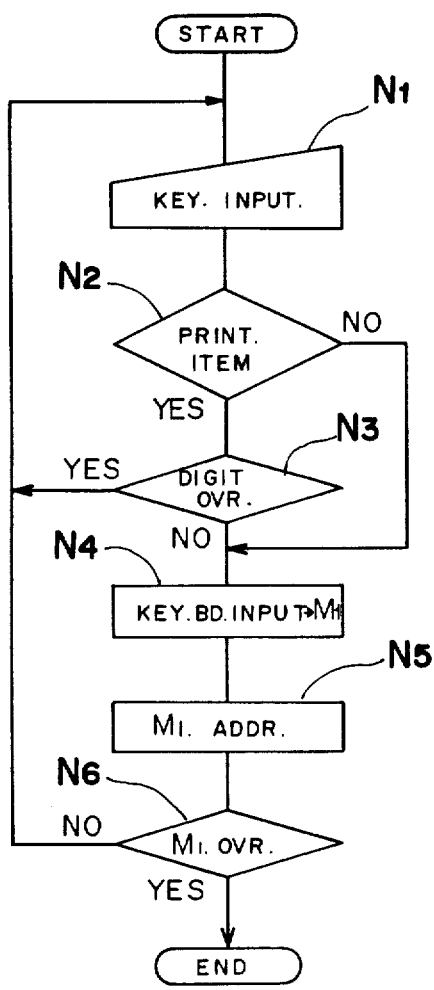
FIG. 5 is a flow-chart for explaining preparation of print data at the side of the drug dispensing apparatus.

Reference is made to FIG. 5 showing a flow-chart for preparing the print format as referred to above.

Upon operation of a function key, indicating preparation of the print format at the key input section 12, the central processing unit 18 starts the processing. At step N1, symbols for the print items at the key input section 12 are input. For example, the first to twelfth letters in a first line in the printing area for the patient's name, represented by the character code "*", is introduced into the central processing unit 18 in the form of a binary code by first operating the * keys of the key input section 12. At step N2, a determination is made as to whether or not the data input from the key input section 12 represents the item to be printed (print item). In this case, the symbols "*" denote the print item of the patient's name. At step N3, it is determined whether or not the number of printed letters for the patient's name exceeds the limited number of sixteen letters. If not, at step N4, the character code representing "*", which is the key input data, is stored in the print format memory M1. This print format memory M1 is provided with addresses corresponding in number to the number of printed letters of the print format, and in this case, stores "*" in the address corresponding to the first letter of the print format. At step N5, the addresses of the print format memory M1 is shifted by one, and after confirming that the address of the print format memory M1 is not exceeded at step N6, the procedure is returned to step N1. An example of the print format being input as shown in FIG. 12, the * keys are subsequently operated repeatedly, whereby character codes representing "*" are stored in the respective addresses of the memory M1 corresponding to the second, third, . . . , and twelfth letters. In the manner as described above, the letters from the first letter up to the twelfth letter in the first line are stored in the area for printing the patient's name corresponding to the prescription data.

It is to be noted here that the limited number of letters for printing the patient's name is sixteen. When the * key is operated at step N1 after the character codes representing "*" have been stored in the respective addresses of the memory M1 corresponding to the first letter to the sixteenth letter by operating the * keys sixteen times, the procedure is shifted from step N3 to step N1 in a standby (waiting) mode to wait for a key input other than by the * key.

In the case where a patient's name only uses twelfth letters, the letters from the thirteenth letter to the eighteenth letter, upon repeated operation of a space key of the key input section 12, the processings at steps N1, N2, N4, N5 and N6 are repeated and a character code representing space is stored in each address of the corresponding memory M1. Accordingly, the portions from the thirteenth letter up to the eighteenth letter in the first line are to be set as the areas where no printing occurs. Thus, when the ! key of the key input section 12 is operated at step N1 to correspond to the nineteenth letter, the character code representing "!" is introduced into the central processing unit 18 by the binary code. The symbol "!" denotes the print item for dosage taking time, and the step is shifted from step N2 to step N3, and subsequently, at step N4, the character code indicating "!" is stored in the address of the memory M1 corresponding to the ninteenth letter. Then, at step N5, the address for the memory M1 is shifted, and after confirmation that the address of the memory M1 has not overflowed at step N6, the procedure is returned to step N1. Thereafter, each time as the ! key is operated seven times, the same processing is repeated, and the character codes representing "!" are stored also in the addresses of the memory M1 corresponding to the twentieth letter to the twenty-sixth letter. The limitation in the number of letters for printing the dosage taking time is up to eight letters, and even if the ! key is operated with respect to the twenty-seventh letter, no registration is effected. Thus, the portions from the eighteenth letter to twenty-sixth letter in the first line are to be stored as the areas for printing the dosage taking time.

With respect to the first letter to eighth letter in the second line, character codes representing "#" are introduced by binary codes at step N1, upon operation of the # keys at the key input section 12 after determinating that the character codes represent the print items for codes at step N2. A determination as to whether or not the limited number of letters "eight" is not exceeded occurs at step N3. The character codes representing "#" are stored at step N4 in the addresses of the memory M1 corresponding to the first letter to the eighth letter in the second line. At step N5, the address of the memory M1 is shifted with a subsequent determination as to whether or not the address of the memory M1 has overflowed at step N6. By the processings as described above, the portions from the first letter to the eighth letter in the second line are to be stored as the areas for printing the codes corresponding to the prescription data.

With respect to the ninth and tenth letters in the second line, the respective steps of N1, N2, N4, N5 and N6 are circulated each time the space key is operated, and the character codes representing the space are stored in the corresponding addresses of the memory M1. Accordingly, the portions for the ninth letter and tenth letter in the second line are to be set as the areas without any printing.

With respect to the eleventh letter to eighteenth letter in the second line, character codes representing "$" are introduced by binary codes at step N1, upon each operation of the $ keys at the key input section 12, after determining that the character codes represent the print items for the prescription date at step N2. A determination as to whether or not the limited number of letters "eight" for the prescription date has not been exceeded occurs at step N3. The character codes representing "$" are stored at step N4 in the addresses of the memory M1 corresponding to the eleventh letter to the eighteenth letter in the second line. At step N5, the address of the memory M1 is shifted with a subsequent determination as to whether or not the address of the memory M1 has overflowed at step N6. By the processings as described above, the portions from the eleventh letter to the eighteenth letter in the second line are to be stored as the areas for printing the prescription date corresponding to the prescription data.

Regarding the nineteenth letter and the twentieth letter in the second line, character codes representing space are stored in the corresponding addresses of the memory M1 by the operation of the space key for storing the areas without any printing. With respect to the twentyfirst letter to the twenty-third letter in the second line, alphabetical keys "N" and "O" and a key "." are successively operated. In this case, at step N1, character codes based on the key contents are introduced by binary codes. At step N2, a determination is made as to whether keys other than the print items are operated. At step N4, the character codes are stored in the respective corresponding addresses of the memory M1. At step N5, the memory M1 is shifted. At step N6, a determination is made whether or not the addresses of the memory M1 has overflowed. Accordingly, the twenty-first letter to the twenty-third letter are to be set for printing as "No.".

With respect to the twenty-fourth letter to twenty-sixth letter in the second line, character codes representing "%" are introduced by binary codes at step N1, upon operation of the % keys at the key input section 12 after determining that the character codes represent the print items for the prescription number at step N2. A determination is made as to whether or not the limited number of letters "three" for the prescription date has not been exceeded at step N3. The character codes representing "%" are stored in the addresses of the memory M1 corresponding to the twenty-fourth letter to the twenty-fourth letter to the twenty-sixth letter in the second line at step N4. At step N5, the address of the memory M1 is shifted with a subsequent determination as to whether or not the address of the memory M1 has overflowed at step N6. By the processings as described above, the portions from the twenty-fourth letter to the twenty-sixth letter in the second line are to be stored as the area for printing the prescription number corresponding to the prescription data.

Concerning the processing with respect to the fifty-second letter, upon detection that the address of the memory M1 has overflowed, the processing for the print format preparation is terminated. By the above function, the print format as shown in FIG. 12 is set, and the print items may be selected as desired, while the order for printing the print items can also be set as desired. Thus, within the range up to the fifty-two letters, spaces or any other messages may be freely set as well as the print items. Moreover, it may be so arranged that, by providing a plurality of memories M1 with fifty-two bytes, separate print formats are set for the respective memories M1 so as to select any desired format during packing of the information into memory.

According to the present invention, messages for representing the time of drug taking can be set as desired. The time of drug taking, for example, includes four kinds of time for "morning", "noon", "evening" and "before going to bed", and moreover, with respect to the drug taking time for morning, noon and evening, each being further divided into "before a meal", "between meals", and "after a meal". Therefore, in the present embodiment, as shown in FIG. 6, messages respectively indicating "before a meal", "between meals" and "after a meal" with respect to "morning", "noon", "evening" and "before going to bed" are prepared. Furthermore, as messages for "ordinary prescription" not particularly designating "before a meal", "between meals" and "after a meal", there are provided "MORNING", "AFT.NOON", "EVENING" and "BED TIME". These messages are stored in the memory M4 as the taking data representing the respective letters constituting the messages respectively in the form of character codes. The memory M4 is addressed by the control counters C1 and C2, and thus, reading and writing in of the taking data are effected.

Figure 7:
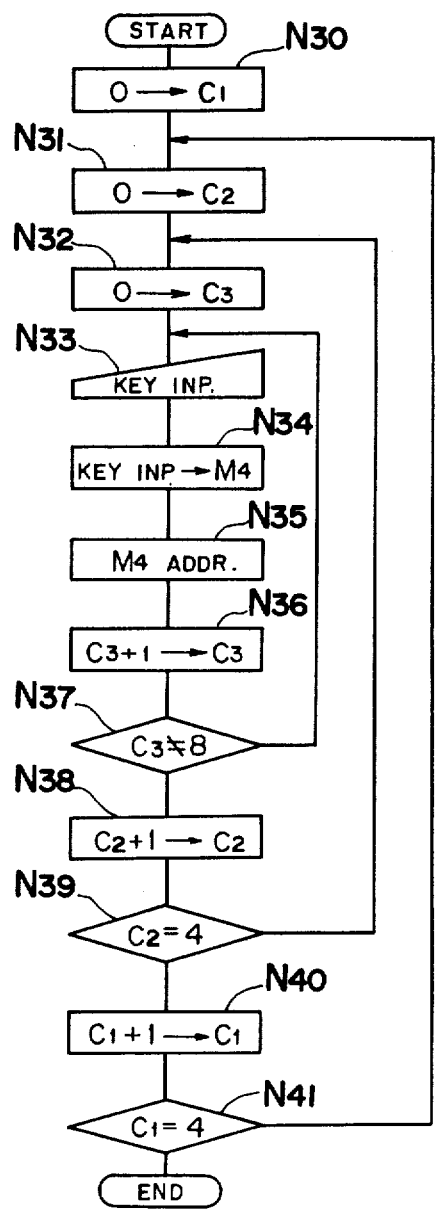
FIG. 7 is a flow-chart for explaining setting of data for taking medicine.

Reference is also made to FIG. 7 showing a flow-chart of the processings for setting the dosage taking data.

At steps N30, "0" is set in the control counter C1 for indicating "ordinary prescription". At step N31, "0" is set in the control counter C2 as the setting related to "morning". At step N32, "0" is set in the control counter C3 for counting the number of letters. Meanwhile, at step N34, the character code related to one letter of taking data input by the key at step N33, is stored in the memory M4. In this case, since the contents of the control counters C1 and C2 are respectively "0", in the memory M4, an area of eight bytes for storing the dosage taking data related to "morning" in "ordinary prescription" is designated, and the character code related to its first letter is stored in the first byte thereof. At step N35, the address of the memory M4 is shifted by one, and the address for storing the character code at the second letter of the taking data is designated. At step N36, one is added in the control counter C3, while at step N37, a determination is made as to whether or not the content of the control counter C3 is eight. If the content is less than eight, the procedure reverts to step N33. Thus, the character code related to the second letter of the taking data to be input by the key at step N33, is stored in the address corresponding to the second letter of the memory M4. In the above embodiment, the dosage taking data related to "morning" of "ordinary prescription" is printed as "MORNING" as shown in FIG. 6, and by operating the space key continuously after successively operating the "M" key, "O" key, "R" key, "N" key, "I" key, "N" key and "G" key, the character codes respectively for "M", "O", "R", "N", "I", "N" and "G" and the character codes for one letter representing the space, are successively stored in the memory area of eight bytes of the memory M4 as designated by the control counters C1 and C2 which are both "0".

Thus, when the control counter C3 has counted "8" to detect that the taking data for the eight letters are set, one is added to the central counter C2 at step N33, while at step N39, the counter C2 is checked whether or not the contents of the control counter C2 have reached "4" for confirmation that the settings for all the dosage taking data with respect to "morning", "noon", "evening" and "before going to bed" are completed. In this case, the contents of the control counter C2 is "1", and the step is returned to step N32 for setting "0" in the control counter C3. Thus, upon key-input of "A", "F", "T", ".", "N", "O", "O" and "N" to print "AFT.-NOON" for the taking data, the memory area of eight bytes of the memory M4 as designated by the control counters C1 and C2 which are "0" and "1", the character codes for the eight letters related to the dosage taking data are successively stored. By the repetition of such processings, when the settings of the respective taking data with respect to "morning", "noon", "evening" and "before going to bed" for "ordinary prescription" are completed, since the contents of the control counter C2 become "4", the procedure is advanced from step N39 to step N40, with one being added to the control counter C1. At control counter C1 step N41, is checked whether the contents have reached "4", to see if the settings of the taking data with respect to all of "ordinary prescription", "before a meal", "between meals" and "after a meal", have been completed. In the above case, the contents of the control counter C1 is "1", and the procedure is returned to step N31 for effecting the setting of the taking prescription before meals. Thus, "before a meal" is set in the processing similar to that described earlier, and in this case, the memory M4 is designated with four kinds of memory areas according to the contents "1" of the control counter C1 and the contents from "0" to "3" of the control counter C2, and in the memory areas of eight bytes, the dosage taking data respectively for "morning", "noon", "evening", and "before going to bed" are stored in the form of the character codes.

For example, in FIG. 7, the dosage taking data with respect to "morning" for "before a meal" is to be printed as "BEF. BKFT", and in the memory areas of eight bytes of the memory M4 designated by the content "1" of the control counter C1 and the content "0" of the control counter C2, the character codes representing "B", "E", "F", ".", "B", "K", "F" and "T" are successively stored. In the storing of "between meals", four kinds of memory areas are designated in the memory M4 according to the content "2" of the control counter C1 and the contents "0" to "3" of the control counter C2 for storing the taking data respectively for "morning", "noon", "evening", and "before going to bed" in "between meals". Meanwhile, in the storing of "after a meal", four kinds of memory areas are also designated in the memory M4 according to the content "3" of the control counter C1 and the contents "0" to "3" of the control counter C2 for storing the taking data respectively for "morning", "noon", "evening", and "before going to bed" in "after a meal". In the manner as described so far, when the taking data with respect to "morning", "noon", "evening" and "before going to bed" respectively for "ordinary prescription", "before a meal", "between meals" and "after a meal", are set, the content of the control counter C1 becomes "4" and the processings for setting the taking data are completed.

It is to be noted here that the print patterns are not limited to those for "ordinary prescription", "before a meal", "between meals" and "after a meal", as in the foregoing embodiment, but may be varied in various ways, for example, to taking prescription patterns according to time, or particular days in a week. The print patterns may be one kind if the contents of the dosage taking data can be set as desired. The purpose for providing the plurality of print patterns as in the present embodiment is to eliminate the troublesome procedures for altering the dosage taking data according to the prescriptions, and some sets of print patterns are preliminarily determined for selection of the proper print pattern each time.

Referring back to FIG. 4, the control circuit section 14 effects the packing control based on the processing data and print data transmitted from the control circuit section 13, and the transfer mode between the control circuit sections 13 and 14 is started by the transmission of a transfer request signal from the control circuit section 14 to the control circuit section 13. In this case, the control circuit section 14 periodically produces this transfer request signal in the state where the packing control is not effected.

Figure 8:
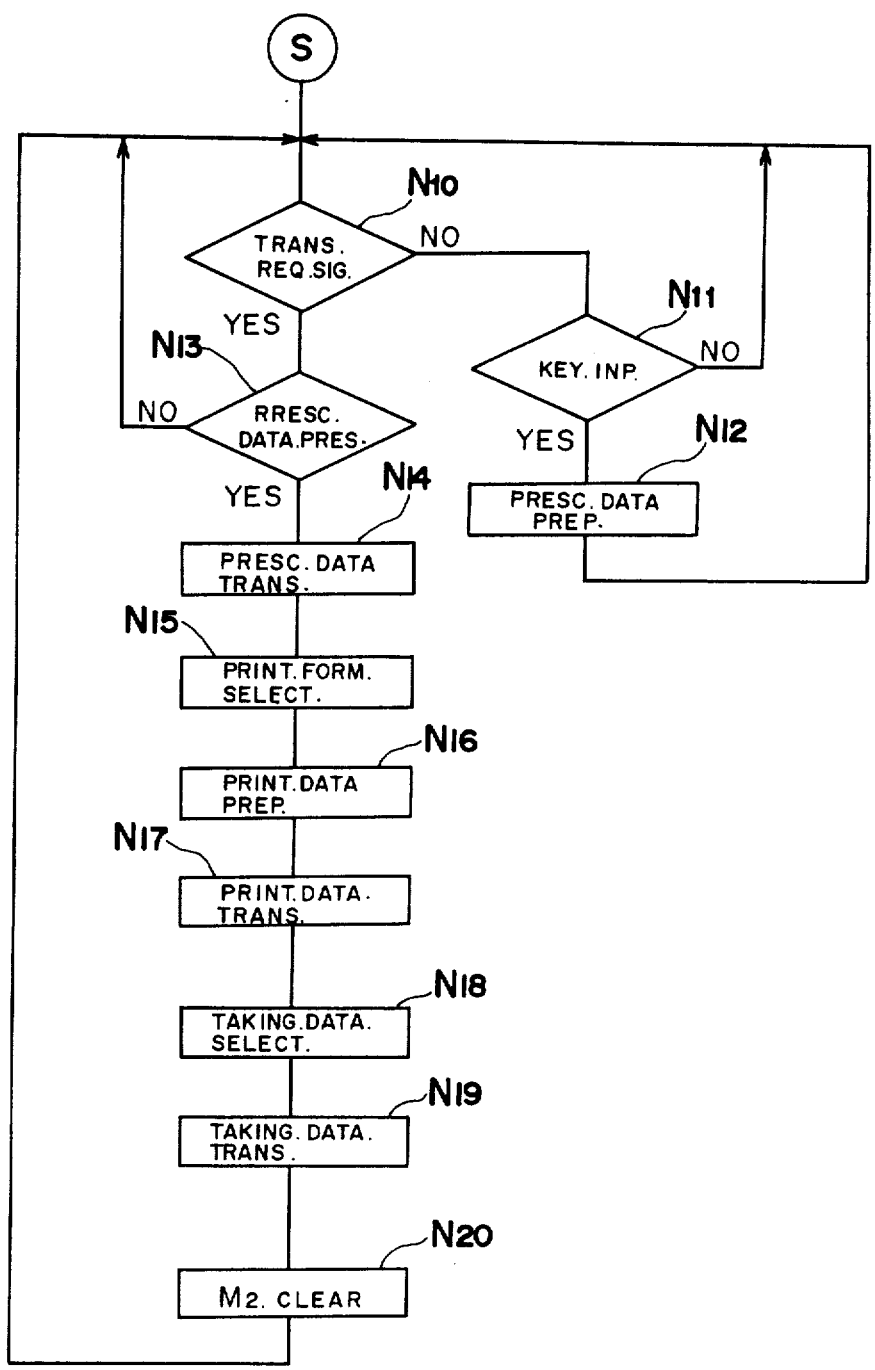
FIG. 8 is a flow-chart for explaining functions at the side of a control device.
Figure 9:
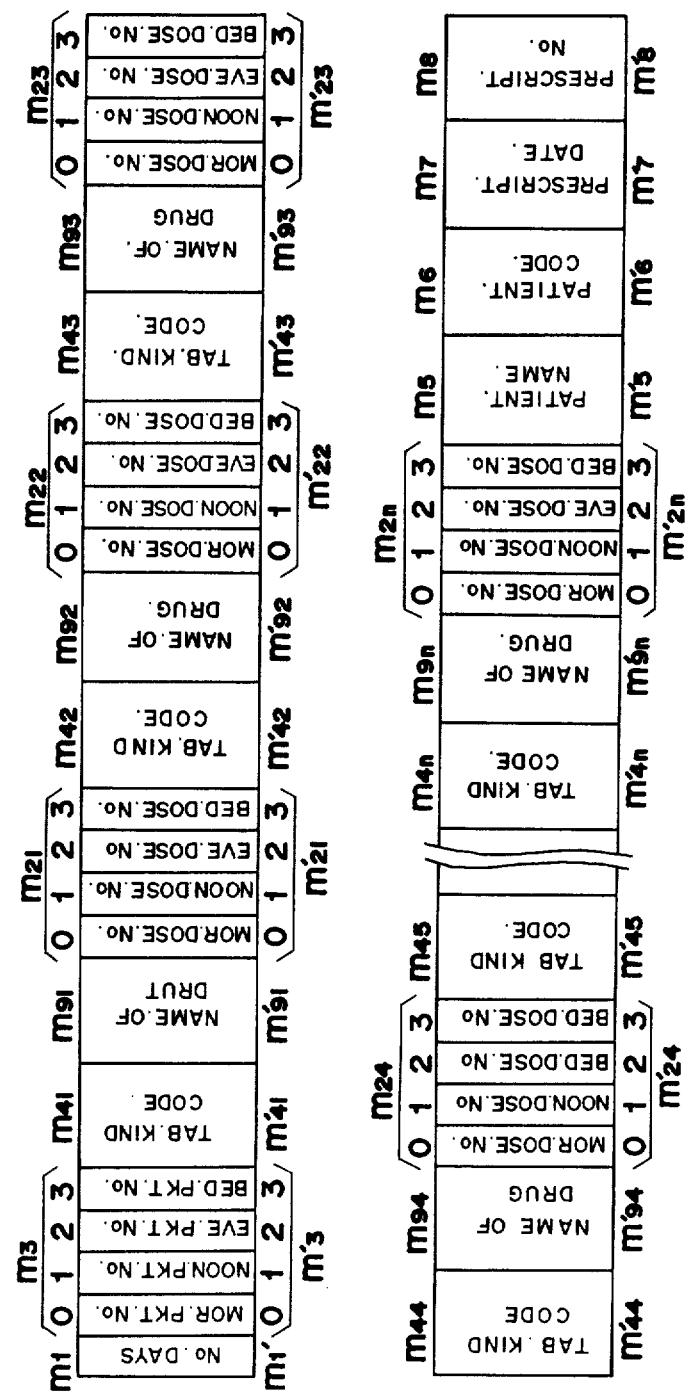
FIG. 9 is a diagram for explaining formats of prescription data.

Referring also to a flow-chart in FIG. 8 showing the function of the control circuit section 13, the central processing unit 18 determines whether or not the transfer request signal is present at step N10. If the transfer request signal is not being produced, at step N11, a determination is made whether or not the key input is present. Upon operation of the key input section 12, when the names of drugs and number of the drug doses to be packed each for "morning", "noon", "evening" and "before going to bed" and the number of days are input by the keys, prescription data based on the above key input are prepared for storing in the prescription data memory M2, according to the format as shown in FIG. 9 at step N12.

More specifically, at step N12, the data for the number of days are written in the memory area m1 of one byte of the prescription data memory M2, while the names of the drug doses designated by the key input are converted into the predetermined tablet type codes (i.e. predetermined code number of the drug) and written in the memory area m4, with the names of drugs being written into the memory area m9. The data for the number of drug doses each for "morning", "noon", "evening" and "before going to bed" with respect to the kinds of tablets to be input by the keys following the designation of the names of drugs, are written into the respective addresses for 0 to 3 of the memory area m2 in four bytes.

In a diagram of FIG. 10 showing the contents of display on the cathode ray tube (CRT) 22 in the key input mode, the names of drugs and the number of drug doses each for "morning", "noon", "evening" and "before going to bed" and the number of days therefor, are respectively displayed at display portions 31, 32, and 33, while the codes of the tablet kinds corresponding to the names of drugs are displayed at a display portion 34. In the above example of FIG. 10, there is shown that information is input by the keys to separately pack for seven days, one tablet each of tables A, B, C and D respectively for "morning", "noon" and "evening". Accordingly, in the respective memory area from m41 to m44 of the prescription data memory M2, the tablet type codes corresponding to the respective tables A, B, C and D are written, while in the addresses 0 to 2 corresponding to "morning", "noon" and "evening" in the respective memory areas from m21 to m24, the data for the number of drug doses "1" is written, the data for the number of drug doses "0" being written in the address 3, and in the respective memory areas from m91 to m94, the names of drugs for A, B, C and D are written, with the data for the number of days "7" being written in the memory area m1. Thus, by the input of the data for the number of drug doses and the data for the number of days, the total number of packets respectively for "morning", "noon", "evening" and "before going to bed" is calculated so as to be stored in the respective addresses 0 to 3 in the memory area m3, and also to be displayed at the display portion 35 of the cathode ray tube 22. Meanwhile, the patients' names, codes, prescription date, and prescription numbers are respectively stored in the memory areas m5, m6, m7 and m8 of the memory M2, and also displayed at the display portions 36, 37, 38 and 39 of the cathode ray tube 22. The patients' names, codes, prescription date and prescription numbers are the data to be printed on the separate packets, and respectively stored in the memory M2 by character codes for each letter and number.

When the prescription data are prepared and stored in the prescription data memory M2 in the manner as described so far, the procedure is returned from step N12 to step N10. Upon detection that the transfer request signal is transmitted from the control circuit section 14 at step N10, the procedure is shifted to step N13 to check whether or not the prescription data is present. In the case where the prescription data is stored in the prescription data memory M2 by the treatment at step N12 as described earlier, at step N14, the data for the number of days, data for the number of drug doses, data for the total number of packets, tablet type codes and names of drugs which are stored in the memory areas m1, m2, m3, m4 and m9 are transferred to the control circuit section 14 as the prescription data through the transmission line 17. In this case, the prescription data are subjected to serial conversion at the interface 15 for the transmission. At step N15, when a plurality of print formats are set, the designated print format is selected by the key input section 12, and at step N16, the print data is prepared based on the designated print format and the data stored in the memory areas m5, m6, m7 and m8 of the prescription data memory M2.

Figure 11:
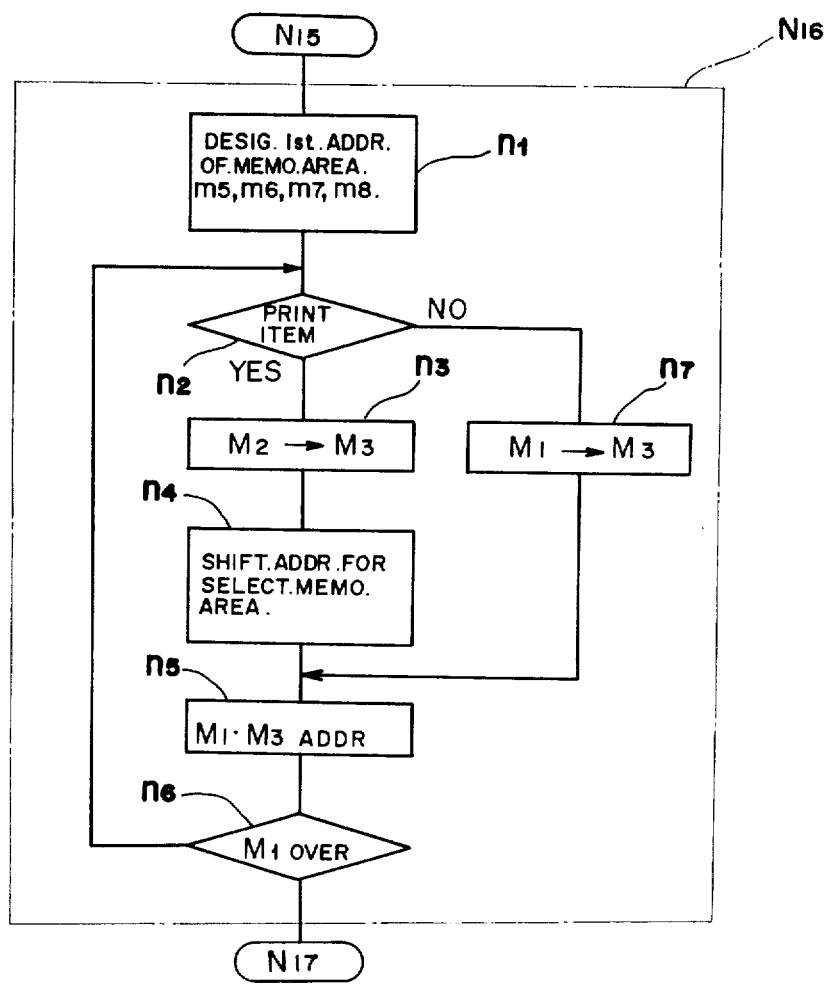
FIG. 11 is a flow-chart for explaining print data preparation.

Reference is also made to a flow-chart of FIG. 11 for explaining the function in step N16.

In FIG. 11, at step n1, the first address for each of the respective memory areas m5, m6, m7 and m8 of the prescription data memory M2 is designated. At step n2, it is determined whether or not the character code stored in the first address of the print format memory M1 represents the print item by any of the symbols "*", "#", "$" or "%" for subsequent shifting to step n3. If the character code indicates other items than the symbol "*", "#", "$" or "%", the items are not the print items, and therefore, the procedure is shifted to step n7. At step n3, the data stored in the first address of the memory area of the memory M2 corresponding to the kind of the print item represented by the symbol is written into the memory M3. In this case, since the character code representing the symbol "*" is stored in the first address of the print format memory M1 to indicate the patient's name, the memory area m5 of the memory M2 is addressed. At step n3, the character code stored in the first address of the memory area m5 is stored in the print data memory M3, which has addresses from 1 to 52 to correspond to the print format memory M1, and the contents read from the memory M2 are stored in the corresponding addresses. At step n4, the address in the selected memory area of the memory M2 is shifted by one, while at step n5, the addresses of the memories M1 and M3 are each shifted by one, and at step n6, it is checked whether or not the address of the memory M1 has overflowed. In this case, the procedure is returned to step n2 at the step where the character code with respect to the first letter of the patient's name has been read. At step n2, the character code stored in the subsequent address of the print format memory M1 is determined. By repeating the functions as described above, the letters to be printed according to the print items are written in the print data memory m3 by the character codes, and thus, the print data is prepared. For example, in the example of printed letters in FIG. 3, "T.HARAGUCHI" is to be printed for the patient's name, and in this case, the respective addresses corresponding to the first letter to the eleventh letter for the first line of the memory M3, character codes respectively representing "T", ".", "H", "A", "R", "A", "G", "U", "C", "H" and "I" are stored. However, since no letter is available for the portions on and after the twelfth letter of the patient's name in this example, such portions are regarded as space, and in the corresponding address of the memory M3, the character code representing the space is stored for shifting to step n2.

At step n2, a determination is made whether or not the character code stored in the address corresponding to the thirteenth letter in the first line of the print format memory M1 represents the print item. In this address, the character code representing the space is stored, and the procedure is shifted to step n7 to store the character code stored in the address in the corresponding address of the print data memory M3. At step n5, the addresses of the memories M1 and M3 are each shifted by one.

Subsequently, since the character codes similarly representing the space are set for the fourteenth to the eighteenth portions in the first line of the print format, steps n2, n7 and N5 are repeated.

As described so far, by effecting the above processings based on the contents of the character codes stored in the respective addresses corresponding to the first letter to the fifty-second letter of the print format memory M1, the printing contents with respect to the respective print items stored in the respective memory areas m5, m6, m7 and m8 of the prescription data memory m2 are stored in the print data memory M3 according to the print format set in the print format memory M1. Thus, when the print contents of the respective print items are within the number of letters set in the print format, the character code representing the space is stored in the remaining portion.

When the print data is prepared and stored in the memory M3 as described above, the print data is transferred to the control circuit section 14 through the transmission line 17 at step N17 (FIG. 8), and in this case, the print data subjected to the serial conversion at the interface 15 is transmitted. At step N18, the dosage taking data designated by the key input section 12 is selected when a plurality of taking data are set, while, at step N19, the taking data thus selected is transmitted. At step N20, the prescription data memory m2 is cleared upon completion of transfer of the print data, and the procedure is returned to step N10 to wait for the subsequent key input. The control circuit section 14 at the side of the drug dispensing unit 11 is arranged to control the packing functions of the unit 11 based on the transferred prescription data and print data.

Figure 13:
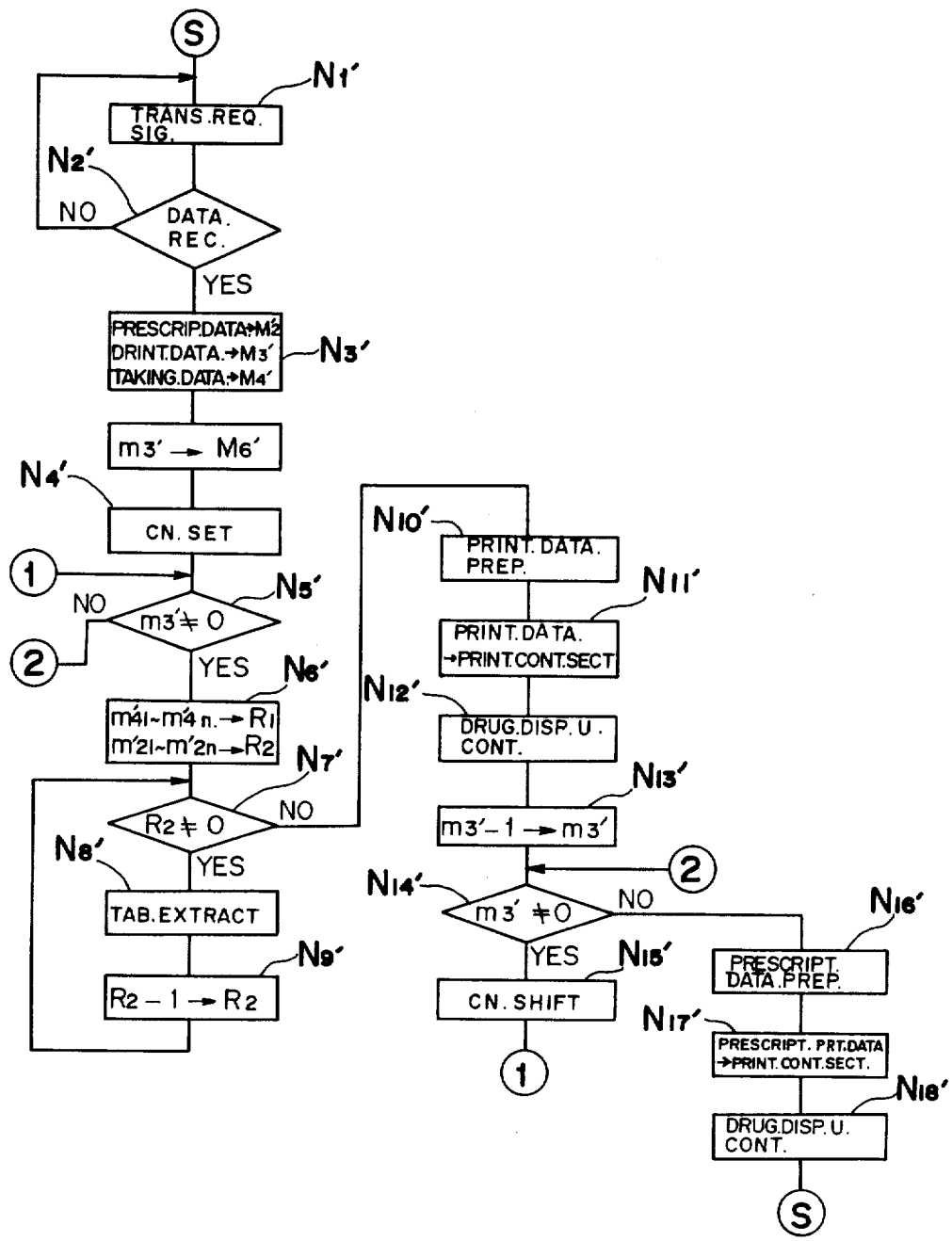
FIG. 13 is a flow-chart for explaining functions at the side of the apparatus.

Referring further to a flow-chart of FIG. 13, the function of the control circuit section 14 will be described hereinbelow.

Figure 17:
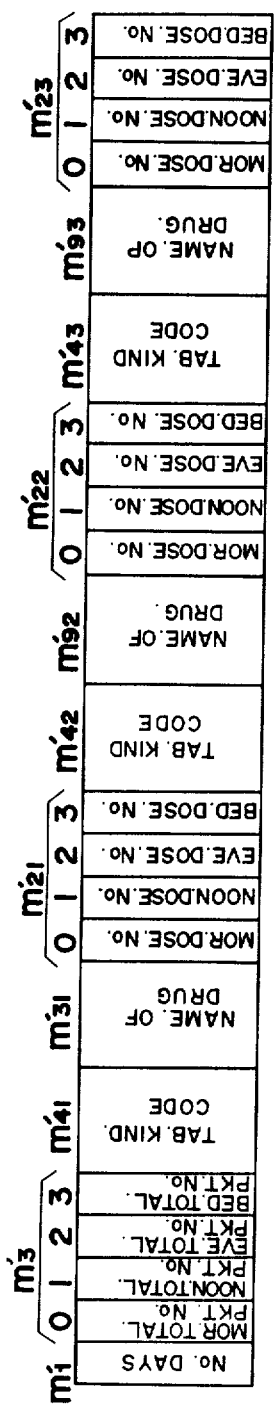
FIG. 17 is a diagram similar to FIG. 9, for explaining formats of prescription data.
Figure 17:
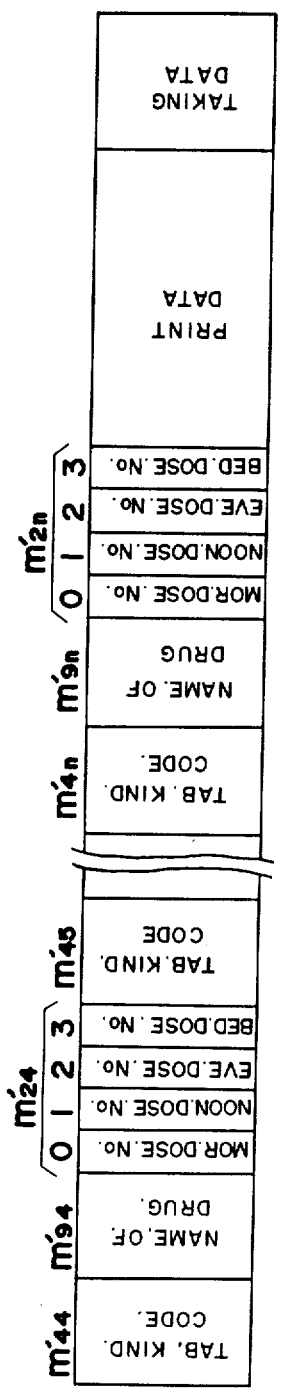

At step N'1, upon emission of the transfer request signal to receive the prescription data and print data, the procedure proceeds from step N'2 to N'3, and the prescription data is stored in the memory M'2, while the print data is stored in the memory M'3. In this case, as shown in FIG. 17, the memory M'2 stores the data for the number of days, data for the number of drug doses, data for the total number of packets, tablet kind codes, and names of drugs, respectively in the memory areas m'1, m'21 to m'2n, m'3, m'41 to m'4n, m'91 to m'9n corresponding to the memory areas m1, m21 to m2n, m3, m41 to m4n, m91 to m9n of the prescription data memory M2, thereby to store the prescription data. Moreover, the data for the total number of packets stored in the memory area m'3 of the memory M'2 is stored also in the memory M'6. Meanwhile, the memory M'3 has the addresses from 1 to 52 in the similar manner as in the print data memory M3, and stores the character codes stored in the respective addresses of the memory m3 in the similar addresses for storing the print data, and further, stores the dosage taking data in the memory M'4. Step N'4 detects the first dosage taking time in a day based on the data of the memory area m'3 of the memory M'2, and sets the value corresponding to said taking time in the control counter 27A. In other words, the first taking time is detected by detecting the address which first stores the contents other than "0", in the respective addresses from 0 to 3 in the memory area m'3. According to "morning", "noon", "evening" and "before going to bed", the detected dosage taking times are set as "0", "1", "2" and "3", in the control counter 27A, and in the present embodiment, since "morning" is the first dosage taking time, the contents CN of the control counter 27A are set to "0". Step N'5 checks whether or not the contents of the memory area m'3 are "0", and in this case, the address 0 of the memory m'3 is designated to correspond to the contents 0 of the control counter 27A, and thus, a determination is made whether or not the contents of the address 0 are "0". Meanwhile, step N'6 stores the tablet type codes of the prescription data stored in the respective memory areas m'41 to m'4n of the memory M'2, in the register R1, and also stores the data for the drug doses stored in the respective memory areas m'21 to m'2n of the memory M'2, in the register R2. In this case, since the contents CN of the control counter 27A are "0", the data for the number of drug doses stored in the address 0 of the memory areas m'21 to m'2n are first read out so as to be stored in the register R2. In the present embodiment, since the data are stored only up to the memory areas m'41 to m'44 and m'21 to m'24, the tablet type codes for the respective tablets A, B, C and D are written in the register R1, and in the register R2, the data of the number of drug doses for the "morning" packet are written with respect to these tablet types. Step N'7 checks whether or not the contents of the register R2 is "0", and if the data for the number of drug doses for at least one of the tablet kinds with respect to the respective kinds of tables A, B, C and D is other than "0", the step is shifted to step N'8 to effect the tablet picking up function. At step N'8, the tablet type codes with respect to the tablet type having the data for the number of drug doses in number other than "0" is read out from the register R1, and introduced into the drug dispensing unit controller 28, which then applies a tablet extraction signal to the drug dispensing cartridges 5 in which the respective kinds of tables A, B, C and D are accommodated. Accordingly, the cartridges 5 to which the extraction signal is applied, are driven each for extraction of one tablet. At step N'9, with respect to each tablet kind subject to the extraction, "1" is subtracted from the data for the number of drug doses thereof, and the procedure is reverted to step N'7. In the present embodiment, since the tables A, B, C and D are wrapped, at one tablet from each, in the packet for "morning", the data for the number of drug doses for the A, B, C and D tablets stored in the register R2 becomes "0". Therefore, the tablets equivalent to one packet for "morning" are extracted to be introduced into the hopper 2, and at subsequent step N'10, print data preparation at the side of the control circuit section 14 is effected.

Figure 14:
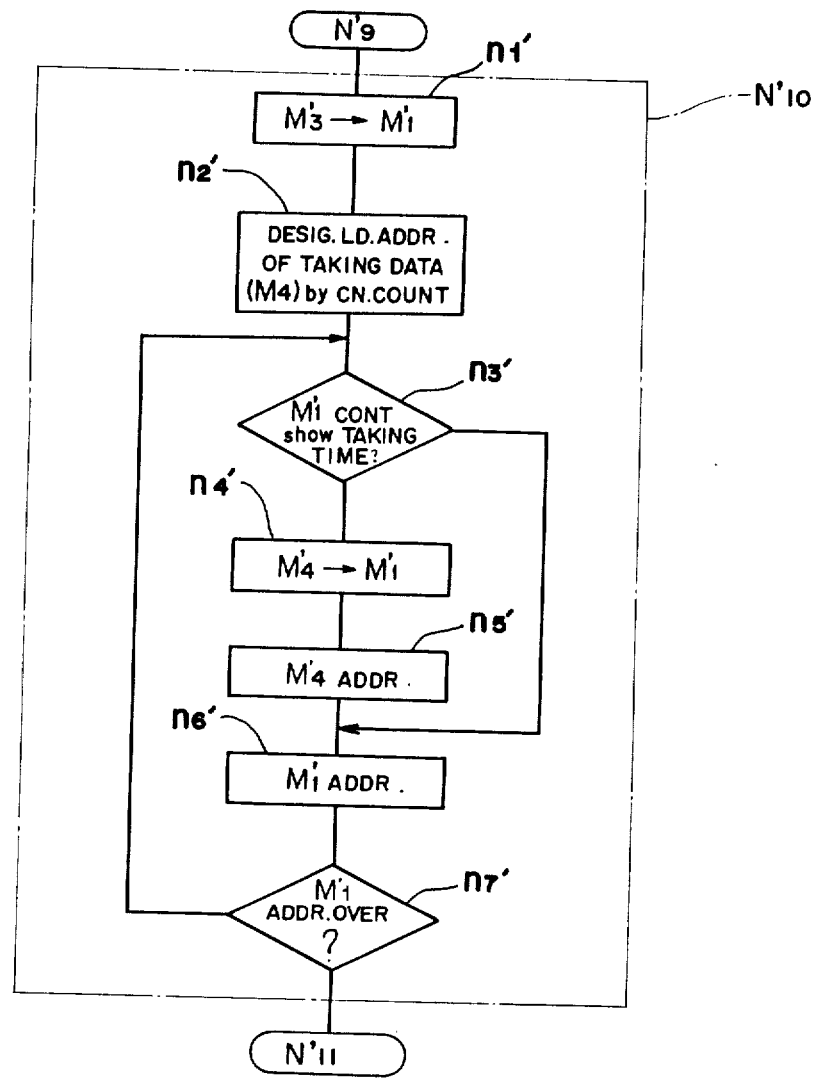
FIG. 14 is a flow-chart for explaining print data preparation at the side of the apparatus.

In FIG. 14, there is shown a flow-chart for explaining the function at step N'10 referred to above.

At step n'1, the print data stored in the memory M'3 is loaded in the memory M'1, while at step n'2, the first address of the memory M'4 which stores the dosage taking data is designated by the count value of the control counter 27A. In this case, the count value CN of the control counter 27A is "0", indicating the dosage taking time for "morning". At step n'3, determination is made whether or not the data stored in the address corresponding to the first letter of the memory M'1 represents the symbol "!" showing the dosage taking time. According to the print format as set forth in the present embodiment, the character codes stored in the addresses corresponding to the nineteenth letter to the twenty-sixth letter of the memory M'1 indicate the dosage taking time. Accordingly, the procedure proceeds from step n'3 to n'6 to shift the address of the memory M'1 by one, and upon detecting at step n'7 that the address of the memory M'1 has not overflowed, the procedure reverts to step n'3, where a determination is made whether or not the character code stored in the address corresponding to the second letter of the memory M'1 represents "!". In the manner as described above, the steps n'3, n'6 and n'7 are successively repeated for processing until the memory M'1 is designated by the address corresponding to the nineteenth letter. Thus, upon designation of the address corresponding to the nineteenth letter of the memory M'1, the procedure proceeds from step n'3 to step n'4, and the character code representing "M" stored in the first address of the memory M'4 is stored in the address of the memory M'1. At step n'5, the address of the memory M'4 is shifted by one, with the address of the memory M'1 being also shifted by one at step n'6, and upon detection that the address of the memory M'1 has not overflowed at step n'7, the procedure is returned to step n'3. Similarly, in the address corresponding to the twentieth letter of the memory M'1, the character code representing the symbol '!" is stored, and upon proceeding from step n'3 to step n'4, the character code representing "O" stored in the subsequent address of the memory M'4 is stored in the address of the memory M'1. At step n'5, the address of the memory M'4 is shifted by one, with the address of the memory M'1 being shifted by one at step n'6, and upon detection that the address of the memory M'1 has not overflowed at step n'7, the procedure is returned to step n'3. Subsequently, in the respective addresses corresponding to the twenty-first letter to the twenty-sixth letter of the memory M'1, the character codes representing "R", "N" "I", "N", "G" and "space" equivalent to one letter following "G", which are stored in the memory M'4, are successively stored. In the respective addresses corresponding to portions after the twenty-seventh letter of the memory M'1, the character codes representing "!" are not stored, and steps n'3, n'6 and n'7 are successively repeated for processing. After designation of the address of the memory M'1 corresponding to the twenty-sixth letter in the second line, the procedure further proceeds from step n'3 to n'6, and upon shifting of the address of the memory M'1, a determination is made whether the address of the memory M'1 has overflowed at step n'7 for shifting to step N'11.

In the manner as described above, the print data is completed by the function that the control circuit section 14 at the side of the drug dispensing unit 11 writes the character codes representing the dosage taking time, in the memory M'1, and at step N'11, the print data is introduced into the printer controller 29, which is provided with a character generator and first, successively converts the character codes from the first letter to the twenty-sixth letter in the second line as represented by the print data, into print signals for applying to the printer 30. Accordingly, the printer 30 functions based on the successively input print signals, and prints the twenty-six letters in the second line in a direction intersecting at right angles with the longitudinal direction of the packaging sheet 6. Thus, the printer controller 29 produces a line renewal signal subsequent to the output of the character codes equivalent to twenty-six letters in the second line, thereby to actuate the stepping motor for driving the line feeding roller 3 for displacing the packaging sheet 6 in the longitudinal direction by one line. Subsequently, the printer controller 29 successively converts the character codes from the first letter to the twenty-sixth letter in the first line, into print signals for application to the printer 30, which then prints the twenty-six letters in the first line to effect the printing as shown in FIG. 3(C). At step N'12, the drug dispensing unit controller 28 applies control signals respectively to the shutter, longitudinal heat seal mechanism 9, and lateral heat seal mechanism 10 provided for the hopper 2 so as to control the respective functions for charging of tablets, formation of separate packets, and sealing thereof, and thereafter, feeds the control signal to the driving device for the feed roller 4 so as to displace the packaging sheet by a predetermined length in the longitudinal direction, thereby to complete the packing function of the packet for "morning". At step N'13, "1" is subtracted from the data stored in the address 0 of the memory area m'3 of the memory M'2, and at step N'14, a determination is made whether or not the data of all the addresses from 0 to 3 of the memory area m'3 are "0". In this case, the operation is at the stage where one packet for "morning" is completed, with "1" being subtracted from the data of the address 0 in the memory area m'2, and at step N'15, the contents CN of the control counter 27A proceeds from "0" to "1" to return the step N'5. At step N'5, the address 1 of the memory area m'3 is designated to correspond to the content "1" of the control counter 27A to see if the content thereof is "0", and in this case, since the content of the address 1 is "7", the procedure is shifted to step N'6 for the packet preparing function for "noon".

At step N'6, the tablet type codes stored in the respective memory areas m'41 to m'4n of the memory M'2 are stored in the register R1, while the data for the number of drug doses in the respective memory areas m'21 to m'2n of the memory M'2 are stored in the register R2. In this case, in the memory areas m'21 to m'2n, the data for the number of drug doses stored in the address 1 are read out, since the count value CN of the control counter 27A is "1". Thus, upon shifting from step N'7 to step N'8, tablets are extracted from the cartridges 5 with respect to the tablet type for which the data for the number of drug doses stored in the register R2 are other than "0", and at step N'9, "1" is subtracted from the data for the number of drug doses in the register R2. In the present embodiment, since the A, B, C and D tablets are wrapped, at one tablet for each, also in the packet for "noon", that data for the number of drug doses in the register R2 become all "0", with the procedure being shifted from step N'7 to step N'10. At step N'10, since the contents CN of the control counter 27A are "1", the character codes representing "AFT.NOON" are respectively stored in the addresses corresponding to the nineteenth letter and twenty-second letter of the memory M'1 for printing "noon" as the dosage taking time. Thus, based on the print data having "AFT.NOON" as the dosage taking time, the printing as shown in FIG. 3(b) is effected on the packaging sheet at step N'11. At step N'12, the packing function of the tablets for the one packet for "noon" taken out into the hopper 2 is effected, while at step N'13, "1" is subtracted from the data stored in the address 1 of the memory area m'3 of the memory M'2 for the completion of the function for preparing one packet for "noon". Subsequently, upon proceeding from step N'14 to step N'15, the contents CN of the control counter 27A proceeds from "1" to "2". Accordingly, the memory area m'3 and memory areas m'21 to m'2n of the memory M'2 are respectively designated by the address 2, while it is set to print "EVENING" with respect to the dosage taking time for the print data, thereby to effect the packet preparing function for "evening". Upon completion of the function for preparing the packet for "evening", the contents CN of the control counter 27A are advanced from "2" to "3", and the procedure is shifted to step N'5. At step N'5, the data stored in the address 3 of the memory area m'3 in correspondence to the contents "3" of the control counter 27A is read out. However, in the prescription data of the present embodiment, since the drug is not taken before going to bed, the contents of the address 3 in the memory area m'3 are "0", and the step proceeds from step N'5 to N'14. Accordingly, in this embodiment, the packet preparing function "before going to bed" is to be omitted, and upon proceeding from step N'14 to step N'15, the contents CN of the control counter 27A are shifted from "3" to "0", and the step is returned to step N'5. Therefore, the preparing function of the packet for "morning" is again effected. In the manner as described so far, the packet preparing function is repeated until all the contents stored in the addresses 0 to 3 of the memory area m'3 of the memory M'2 in the order of "morning", "noon" and "evening", become "0". Thus, when all the data stored in the addresses 0 to 3 of the memory area m'3 of the memory M'2 have become "0", the packing function for one prescription data is regarded as completed, and the step is advanced from step N'14 to N'16.

Figure 3:
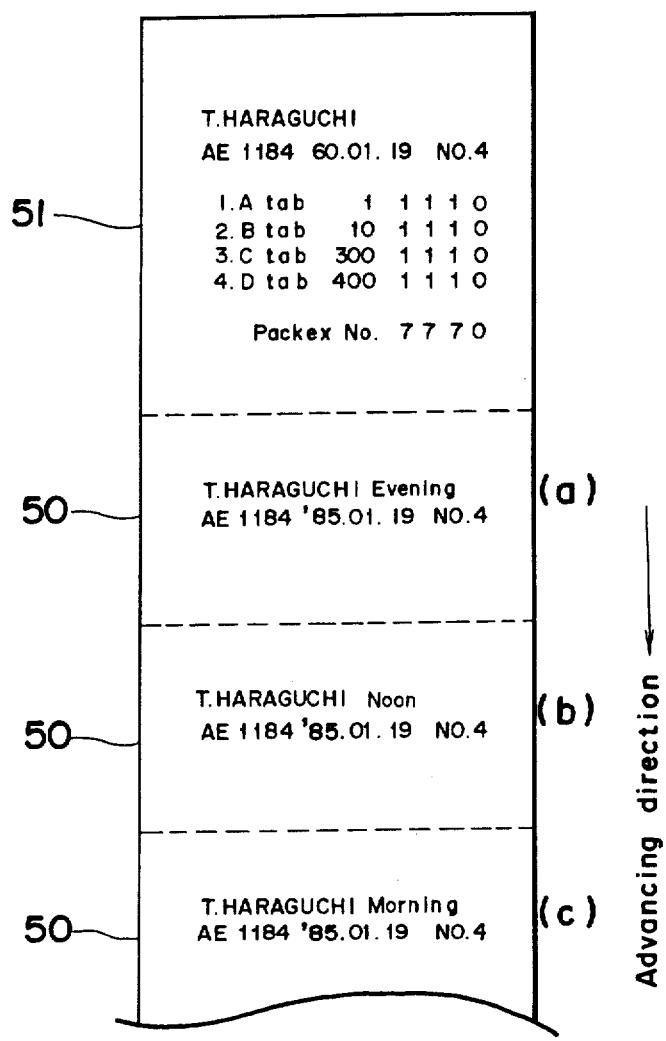
FIG. 3 is a diagram showing one example of printing.

As shown in FIG. 3, the present invention is characterized in that, apart from the separate packet portions 50, a prescription indicating portion 51 is formed at part of the packaging sheet, and the contents of the prescription are printed at the portion 51, whereby an operator can confirm the contents of the prepared drug. In the memory M'5, there are preliminarily provided areas for storing the contents to be printed respectively from the first line to the nth line. Step N'16 is intended to prepare the data for the prescription contents so as to store in the memory M'5, and in FIG. 15, there is shown a flowchart for explaining the function at step N'16.

Figure 15:
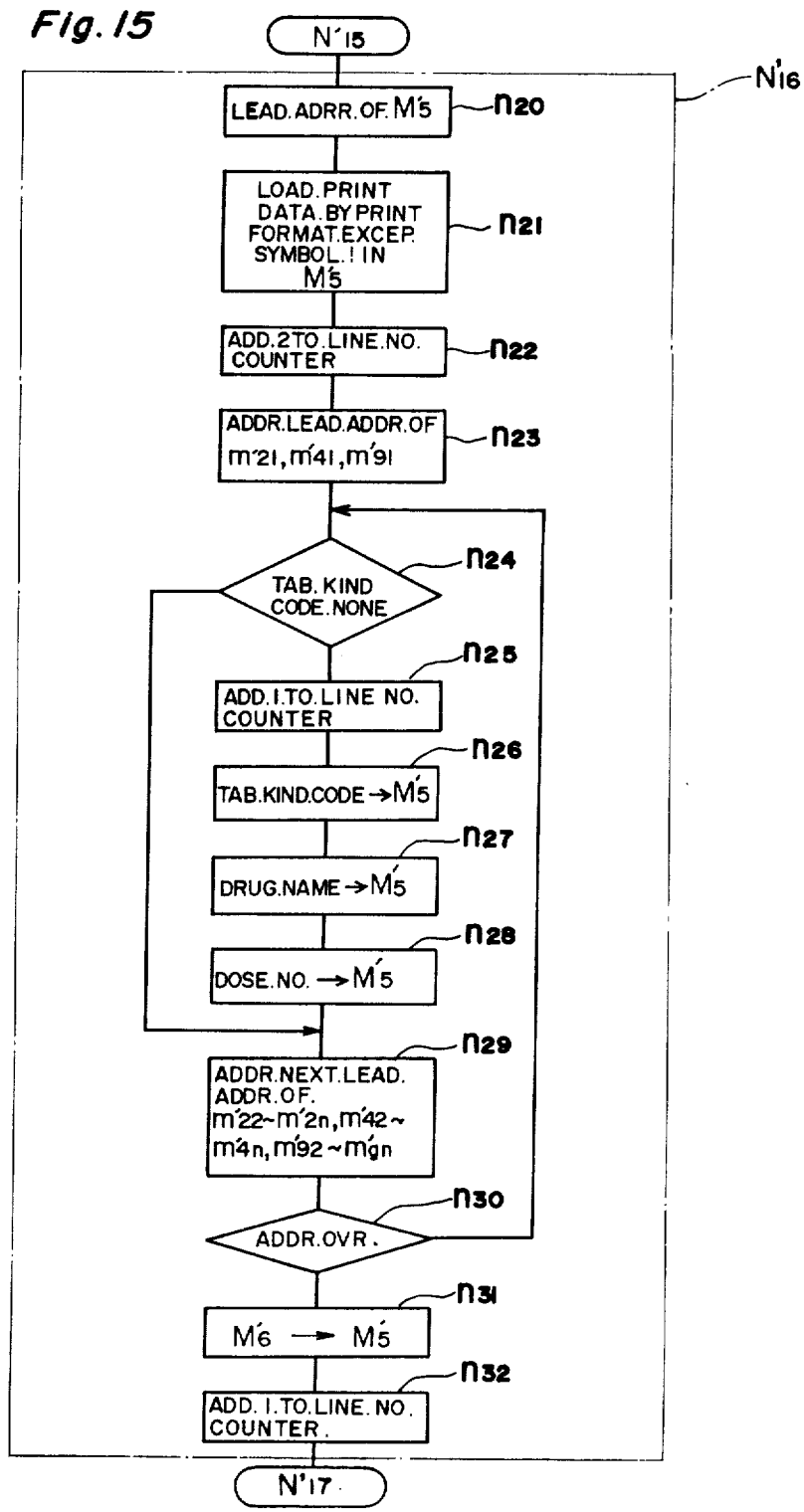
FIG. 15 is a flow-chart for explaining prescription print data preparations.

In FIG. 15, in the first place at step n20, the leading address of the area to store the print contents in the first line is addressed. In the data for the prescription contents according to the present embodiment, it is arranged to print the print data except for the dosage taking time in the first line and second line. Accordingly, at step n21, the symbol "!" of the print format stored in the memory M'3 is replaced by the space for loading into the memory M'5. In this case, since the print data is for two lines, the respective addresses in the areas for storing the print contents for the first line and second line are successively addressed in the memory M'5. In the manner as described above, by loading the data of the prescription contents up to the second line thereof, in the memory M'5, the contents of the line number counter 27B are added by 2 in the subsequent step n22. At step n22, the leading addresses of the respective memory areas m'21, m'41 and m'91 in the memory area M'2 are set. At step n24, the leading addresses to the predetermined addresses of the memory area m'41 are successively addressed, for reading out the contents stored in this area to see if they are "0". In this case, since the tablet kind code with respect to the table A is stored in this memory area, the procedure is shifted to step n25. At step n25, "1" is added to the contents of the line number counter 27B. At step n26, the contents of the memory area m'4 are loaded in the memory M'5, and at step n27, the leading addresses to the predetermined addresses of the memory area m'91 are successively addressed, thereby to read out the contents stored in the memory area for loading into the memory M'5. At step n28, the address 0 to the address 3 of the memory area m'21 are successively addressed, and the data for the number of drug doses stored in this area is loaded in the memory M'5. At step n29, the leading addresses of the memory areas m'21, m'41 and m'91 of the memory M'2 are stored. At step n30, the procedure reverts to step n24 on the conditions that the respective leading addresses of the memory areas m'21, m'41 and m'91 have not exceeded the maximum address. By the repetition of the processing from step n24 to step n30 as described above, the memory areas m'21, m'22, m'23 and m'24, the memory areas m'41, m'42, m'43 and m'44, and memory areas m'91, m'92, m'93 and m'94 are successively accessed, and the drug names, tablet type codes, and the data for the number of drug doses for the tablets A, B, C and D are loaded in the memory M'5. Thus, after loading the various data up to the tablet D in the memory M'5, the leading address for the memory area m'45 is stored at step n29, and the memory area m'45 is accessed at step n24. In the present embodiment, since the medicines to be prepared are of four types, the contents of the memory area m'45 is "0". Accordingly, the procedure is shifted from step n24 to step n29, and the respective leading addresses of the memory areas m'21, m'41 and m'91 are set. At step n30, the procedure is returned to step n24, provided that the respective leading addresses have not exceeded the maximum address. By the repetition of the above processing, the respective leading addresses from the memory areas m'25, m'45 and m'95 to the memory areas m'2n, m'4n and m'9n are successively set, and subsequently, since the address set at step n20 exceeds the maximum address, the procedure is shifted to step n31. At step n31, the data for the total number of packets stored in the memory M'6 is loaded into the memory M'5. At step n32, by the loading of the number of packets data into the memory M'5 as one line of the prescription print data, "1" is added to the line number counter 27B.

As described so far, when the data for the prescription contents is prepared and stored in the memory M'5 at step n'16, this prescription print data is printed on the packaging sheet 6 at step N'17.

Figure 16:
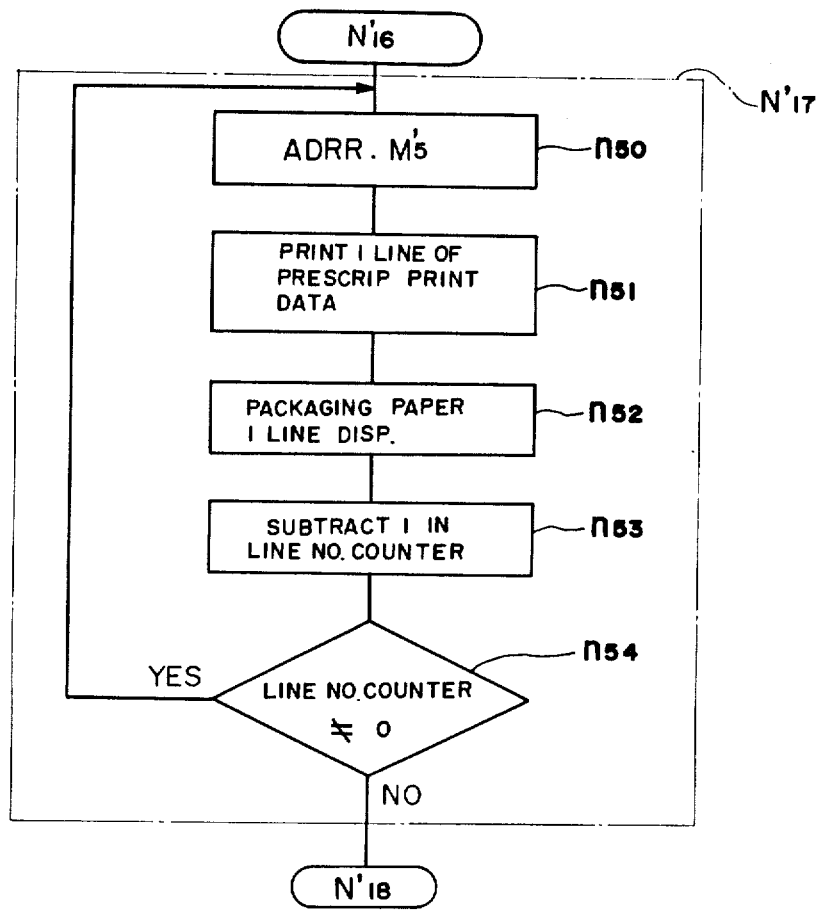
FIG. 16 is a flow-chart for explaining printing of prescription print data.

Reference is also made to FIG. 16 showing a flowchart for explaining the function of step N'17.

At step n50, the predetermined address of the memory M'5 is addressed by the contents of the line number counter 27B, and at step n51, the contents of this address is introduced into the printer controller 29. As shown in FIG. 3, the data for the prescription contents in the case of the present embodiment are in two lines for the print data, four lines for the medicine and taking data, and one line for the packet number data, with the line number counter 27B counting "7". Accordingly, in the first place, based on the count value "7" of the line number counter 27B, the data for the number of packets is read out from the area storing the print contents at the seventh line, of the memory M'5, and by the control of the printer controller 29, "Packet No. 7770" is printed at the printer 30. At step n52, the line feeding roller 3 is controlled to feed the packaging sheet by one line in the longitudinal direction, and at step n53, "1" is substracted from the contents of the line number counter 27B, and at step n54, it is ensured that the contents of the line number counter 27B are not "0" for returning to step n50. At this time, the contents of the line number counter 27B is "6", based on which, at step n50, the drug name, tablet kind code and data for the number of drug doses with respect to the tablet D are read out from the area storing the print contents in the sixth line of the memory M'5. Accordingly, at step n51, the printer 30 prints "4.D tablet 400 1110" (as at 51 in FIG. 3). Subsequently, at step n52, the packaging sheet 6 is displaced in the longitudinal direction by one line, and at step n53, after subtracting "1" from the contents of the line number counter 27B, the procedure reverts from step n54 to step n50. The processing as described above is repeated until the contents of the line number counter 27B becomes "0", while the medicine name, tablet kind code, data for the number of drug doses, and print data are read out from the memory M'5 according to the count value of the line number counter 27B, and the printer 30 prints these data on the packaging sheet 6 as it is controlled by the printer controller 29. Thus, when the count value of the line number counter 27B reaches "0", the procedure is shifted from step n54 to step N'18 (FIG. 13).

At step N'18, the drug dispensing unit controller 28 applies the control signal to the driving device of the feeding roller 4, and further displaces the packaging sheet 6 by the predetermined length in the longitudinal direction. By the above function, subsequent to the preparation of the predetermined number of separate packets, the prescription contents indicating portion 51 printed with the data for the prescription contents is formed (FIG. 3). Then, the processing by the control circuit section 24 reverts to step N'1, and the one prescription function of the control circuit section 14 is completed.

According to the present invention, since the prescription print data is prepared for the printing based on the input of the packet forming data, it becomes possible to check the result of packing with respect to the prescription. Furthermore, due to the arrangement that the prescription print data is printed on the prescription contents indicating portion to be formed separately from the divided packet portions of the packaging sheet, not only the checking is facilitated, by also there is available an advantage of a double checking, since the checking may be made by a third person even at a place remote from a dispensary.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A drug dispensing apparatus which forms divided separate packages during intermittent transport of a belt-like packaging sheet in a longitudinal direction, said drug dispensing apparatus printing predetermined information for each item on said separate packages and inserting one drug dose into each of said separate packages based on a prescription which has been input into said apparatus and which indicates unique medicinal needs of a patient, said separate packages being subsequently sealed for dispensing, said drug dispensing apparatus comprising:

a plurality of symbol keys, each symbol key being provided for each item of information to be printed on said separate packages;

pring format memory having stored therein print format for designating the number of characters to be printed and for designating printing portions which indicate where the printing information for each item is to be printed on said separate packages, said print format memory having memory portions corresponding in number to a maximum number of characters which can be printed onto the separate packages;

an address means for sequentially addressing the memory portions of said print format memory each time said symbol keys are operated;

output means for outputting the character codes representing symbols input through operation of said symbol keys;

preparation means for preparing the print format in said pring format memory by loading the character codes, representing the symbols input by said symbol keys, into the addressed memory portions of said print format memory;

prescription data memory for storing specific printing for each item to be printed on said separate packages, said prescription data memory storing said specific printing by storing the character codes representing characters which represent said specific printing;

print data memory having memory portions corresponding in number to the maximum number of characters which can be printed on the separate packages, said memory portions corresponding to said memory portions of said print format memory;

detecting means for detecting a range in size of each memory portion stored for each character code stored in the memory portions of said print format memory by extracting the memory portion storing the character codes, said detecting means specifying the range for printing the specific printing with respect to the item corresponding to the symbol represented by said character code on the separate packages;

print data preparing means for preparing print data by successively addressing the memory portions of print data memory corresponding to the maximum number of characters which can be printed on the separate packages for the specific printing with respect to specific items to be printed, and also, by reading from said prescription data memory, the respective character codes, representing characters constituting the specific printing which is equivalent to said item, for successive loading thereof into said memory portions of the addressed print data memory; and a printer for printing said separate packages based upon said print data stored in said print data memory, said separate packages being printed in synchronization with the intermittent transport of said packaging sheets in the longitudinal direction.

2. A drug dispensing apparatus as claimed in claim 1, further including a print prescription memory for storing data necessary for printing the type of drug dosage to be accommodated in the separate packages and the number of the drug doses for each type, based on the prescription information, and means for forming a prescription display portion by further transferring said packaging sheet in the longitudinal direction, after formation of the number of separate packages designated in the prescription information, said printer successively printing the data stored in said print prescription memory, onto said prescription display portion, after printing the print data stored in said print data memory, onto said separate packages.

3. A drug dispensing apparatus as claimed in claim 1 or 2, further including a plurality of numerical/character keys provided apart from said symbol keys, and means for outputting numerical/character codes representing the numerals/characters thereof through operation of said numerical/character keys, said memory portion of said print format memory being addressed in the similar manner as in the operation of said symbol keys, also by the operation of said numerical/character keys so as to store character codes representing the numerals/characters for said keys, the memory portion of said print data memory which corresponds to said memory portion of said print format memory being loaded with the character codes of said numerals/characters stored in said memory portion to print the equivalent numerals/characters on the printing portion of the separate packages corresponding to the memory portion storing said character codes.

4. A drug dispensing apparatus which forms divided separate packages during intermittent transport of a belt-like packaging sheet in a longitudinal direction, said drug dispensing apparatus printing messages for dosage taking time on said separate packages, and inserting one drug dose into each of said separate packages based on a prescription which has been input into said apparatus and which includes unique medicinal needs of a patient, said separate packages being subsequently sealed for dispensing, said drug dispensing apparatus comprising;

print format memory having stored thereon print format for designating the number of characters to be printed and for designating printing portions which indicate where the message for dosage taking time is to be printed on said separate packages, said print format memory having memory portions corresponding in number to a maximum number of characters which can be printed onto the separate packages;

a plurality of symbol keys used for designating the region for printing the message for dosage taking time on the separate packages, when the print format is set in said print format memory;

other keys used for designating the region for not printing the message on the dosage taking time on the separate packages, when the printing format is set in said print format memory;

an address means for sequentially addressing the memory portions of said print format memory each time said symbol keys and said other keys different from said symbol keys are operated;

output means for outputting character codes representing symbols input through operation of said symbol keys;

preparation means for preparing the print format in said print format memory by loading the character codes, representing the symbols input by said symbol keys, into the addressed memory portions of said print format memory addressed through operation of said symbol keys;

a dosage taking data memory which stores the message by storing the character codes representing characters constituting the message, each message representing respective dosage taking times;

a print data memory having memory portions corresponding in number to the maximum number of characters which can be printed on the separate packages, said memory portions corresponding to said memory portions of said print format memory;

determining means for determining the taking time of the drug dose accommodated in the separate packages to be printed, by said prescription information;

detecting means for detecting a range in size of each memory portion stored for each character code stored in the print format by extracting the memory portion storing the character codes representing symbols of said symbol keys addressing the respective memory portions of said print format memory, said detecting means specifying the range for printing the message with respect to the dose taking time on the separate packages;

a memory portion addressing means for successively addressing the memory portions of the print data memory equivalent to the range for printing the messages for the dosage taking time on the separate packages, when said range is specified on said separate packages;

a print data preparing means for preparing print data by reading from said dosage taking data memory, the respective character codes representing characters constituting the message for the dosage taking time of the drug dose accommodated in the separate packages to be printed for successive loading thereof into the memory portions of said addressed print data memory; and a printer for printing said separate packages based upon said print data stored in said print data memory, said separate packages being printed in synchronization with the intermittent transport of said packaging sheets in the longitudinal direction.

5. A drug dispensing apparatus as claimed in claim 4, wherein said dosage taking data memory stores a plurality of messages for each dosage taking time, said drug dispensing apparatus further including a means for selecting predetermined message for each dosage taking time; said print data preparing means reading from said dosage taking data memory, the character codes representing the respective characters constituting the message selected by said selecting means to be loaded into said print data memory.

6. A drug dispensing apparatus as claimed in claim 4 or 5, wherein said determining means for determining the taking time of the drug dose accommodated in the separate packages to be printed by the prescription information, can repeatedly count up to the number of dosage giving times per one day, and includes a counter which is counted up by one, each time the message with respect to the dosage taking time is printed on the separate packages, said determining means reading specific messages from said dosage taking data memory based on the count value of said counter to load into said print data memory.

7. A drug dispensing apparatus as claimed in claim 6, wherein said determining means controls said counter so that, even when the dosage giving time is not set with respect to a certain dosage taking time, such dosage taking time is counted up.

8. A drug dispensing apparatus as claimed in claim 4, 5, or 7, further including a print prescription information, and means for forming the prescription display portion by further transferring the sheet in the longitudinal direction, after formation of the separate packages as designated in said prescription information, said printer successively printing the data stored in said print prescription memory onto said prescription display portion, after printing the print data stored in said print data memory on said separate packages.

* * * * *